United States Patent
Lisinski et al.

(10) Patent No.: US 9,526,130 B2
(45) Date of Patent: Dec. 20, 2016

(54) TRANSPARENT PANEL HAVING A HEATABLE COATING

(75) Inventors: Susanne Lisinski, Köln (DE); Günther Schall, Kreuzau (DE); Dang Cuong Phan, Aachen (DE); Bernhard Reul, Herzogenrath (DE); Lothar Schmidt, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 580 days.

(21) Appl. No.: 13/818,093

(22) PCT Filed: Aug. 26, 2011

(86) PCT No.: PCT/EP2011/064699
§ 371 (c)(1),
(2), (4) Date: May 3, 2013

(87) PCT Pub. No.: WO2012/031907
PCT Pub. Date: Mar. 15, 2012

(65) Prior Publication Data
US 2013/0213949 A1    Aug. 22, 2013

(30) Foreign Application Priority Data

Sep. 9, 2010  (EP) ..................................... 10175987
Jun. 11, 2011 (EP) ..................................... 11169654

(51) Int. Cl.
*H05B 3/03* (2006.01)
*H05B 3/84* (2006.01)
(Continued)

(52) U.S. Cl.
CPC ........... *H05B 3/84* (2013.01); *B32B 17/10036* (2013.01); *B32B 17/10174* (2013.01);
(Continued)

(58) Field of Classification Search
None
See application file for complete search history.

(56) References Cited

U.S. PATENT DOCUMENTS 6,492,619 B1 * 12/2002 Sol ................................ 219/203
7,880,120 B2 * 2/2011 Schmidt et al. ............... 219/203
(Continued)

FOREIGN PATENT DOCUMENTS

| CN | 1856901 A | 11/2006 |
|---|---|---|
| CN | 102640562 A | 8/2012 |

(Continued)

OTHER PUBLICATIONS

PCT Written Opinion mailed on Dec. 20, 2011 for PCT/EB2011/064699 filed on Aug. 26, 2011 in the name of Saint-Gobain Glass France (English + German).

(Continued)

*Primary Examiner* — Joseph M Pelham
(74) *Attorney, Agent, or Firm* — Steinfl & Bruno, LLP

(57) ABSTRACT

A transparent pane having an electrically heatable coating is described. The transparent pane is electrically connected to at least two first electrodes provided for electrical connection to two terminals of a voltage source. A heating field includes at least one coating-free zone. At least one second electrode is provided for electric connection to one terminal of the voltage source. A method for manufacturing the transparent pane is also described.

16 Claims, 10 Drawing Sheets

(51) Int. Cl.
*H05B 3/86* (2006.01)
*H05B 1/00* (2006.01)
*H01C 17/06* (2006.01)
*H01R 43/00* (2006.01)
*B32B 17/10* (2006.01)

(52) U.S. Cl.
CPC ............ *H01C 17/06* (2013.01); *H01R 43/00* (2013.01); *H05B 1/00* (2013.01); *H05B 3/03* (2013.01); *B32B 17/10761* (2013.01); *H05B 2203/008* (2013.01); *H05B 2203/016* (2013.01); *Y10T 29/49083* (2015.01); *Y10T 29/49099* (2015.01); *Y10T 29/49204* (2015.01)

(56) References Cited

U.S. PATENT DOCUMENTS

| | | | | |
|---|---|---|---|---|
| 8,022,333 | B2* | 9/2011 | Maeuser | 219/203 |
| 8,431,867 | B2* | 4/2013 | Blanchard et al. | 219/203 |
| 8,431,871 | B2* | 4/2013 | Schmidt et al. | 219/203 |
| 8,809,742 | B2* | 8/2014 | Reul et al. | 219/203 |
| 8,841,585 | B2* | 9/2014 | Offermann et al. | 219/203 |
| 9,100,996 | B2 | 8/2015 | Lisinski et al. | |
| 9,283,733 | B2 | 3/2016 | Blanchard et al. | |
| 2002/0015824 | A1* | 2/2002 | Kawamoto et al. | 428/156 |
| 2003/0116551 | A1* | 6/2003 | Sol et al. | 219/203 |
| 2004/0200821 | A1* | 10/2004 | Voeltzel | 219/203 |
| 2006/0186105 | A1 | 8/2006 | Voeltzel | |
| 2007/0187382 | A1* | 8/2007 | Mauser | 219/203 |
| 2009/0044464 | A1* | 2/2009 | Schmidt et al. | 219/203 |
| 2009/0166347 | A1* | 7/2009 | Blanchard et al. | 219/201 |
| 2010/0270280 | A1* | 10/2010 | Blanchard et al. | 219/203 |
| 2011/0062139 | A1* | 3/2011 | Schmidt et al. | 219/203 |
| 2012/0103961 | A1* | 5/2012 | Offermann et al. | 219/203 |
| 2012/0193341 | A1* | 8/2012 | Reul et al. | 219/203 |
| 2013/0161309 | A1* | 6/2013 | Lisinski et al. | 219/203 |
| 2013/0220992 | A1* | 8/2013 | Lisinski et al. | 219/522 |
| 2014/0123048 | A1 | 5/2014 | Bodipat | |

FOREIGN PATENT DOCUMENTS

| | | | |
|---|---|---|---|
| DE | 102007008833 | A1 | 8/2008 |
| DE | 102008018147 | A1 | 10/2009 |
| DE | 102008029986 | A1 | 1/2010 |
| DE | 202008017611 | U1 | 4/2010 |
| DE | 102009025888 | A1 | 12/2010 |
| DE | 102012018001 | A1 * | 5/2013 |
| EP | 0847965 | B1 | 10/2004 |
| EP | 2334141 | A1 | 6/2011 |
| GB | 2381179 | A | 4/2003 |
| JP | 2013527538 | A | 6/2013 |
| JP | 2013541807 | A | 11/2013 |
| MX | 2008009080 | A | 9/2008 |
| MX | 2009007437 | A | 8/2009 |
| WO | 2007083038 | | 7/2007 |
| WO | 2011/006743 | A1 | 1/2011 |

OTHER PUBLICATIONS

PCT Written Opinion mailed on Dec. 20, 2011 for PCT/EB2011/064708 filed on Aug. 26, 2011 in the name of Saint-Gobain Glass France (English + German).

PCT International Search Report mailed on Dec. 20, 2011 for PCT/EB2011/064699 filed on Aug. 26, 2011 in the name of Saint-Gobain Glass France.

PCT International Search Report mailed on Dec. 20, 2011 for PCT/EB2011/064708 filed on Aug. 26, 2011 in the name of Saint-Gobain Glass France.

Non-Final Office Action for U.S. Appl. No. 13/818,095, filed May 8, 2013 on behalf of Susanne Lisinski. Mail Date: Dec. 2, 2014. 10 pages.

Notice of Allowance for U.S. Appl. No. 13/818,095, filed May 8, 2013 on behalf of Susanne Lisinski. Mail Date: Jun. 22, 2016. 5 pages.

* cited by examiner

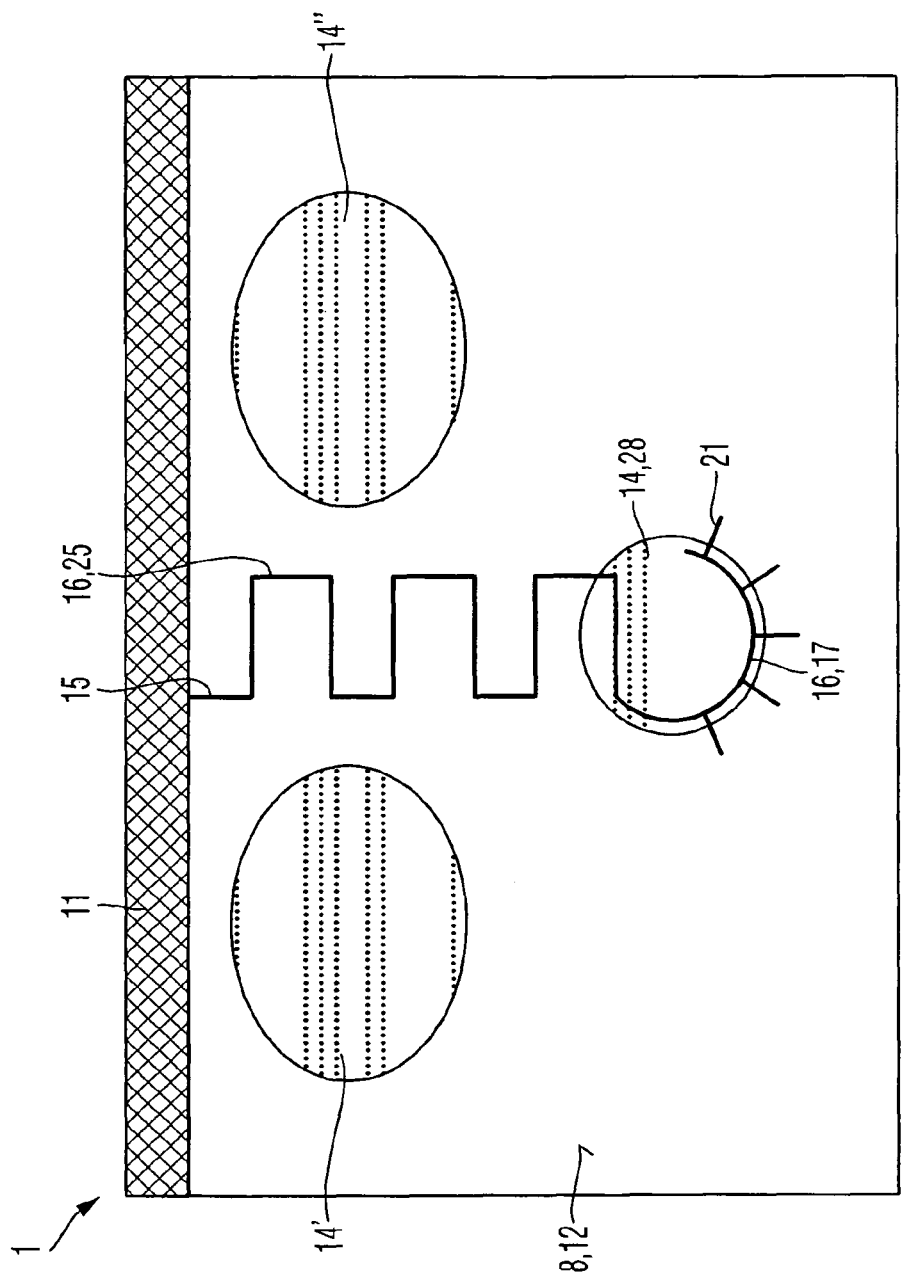

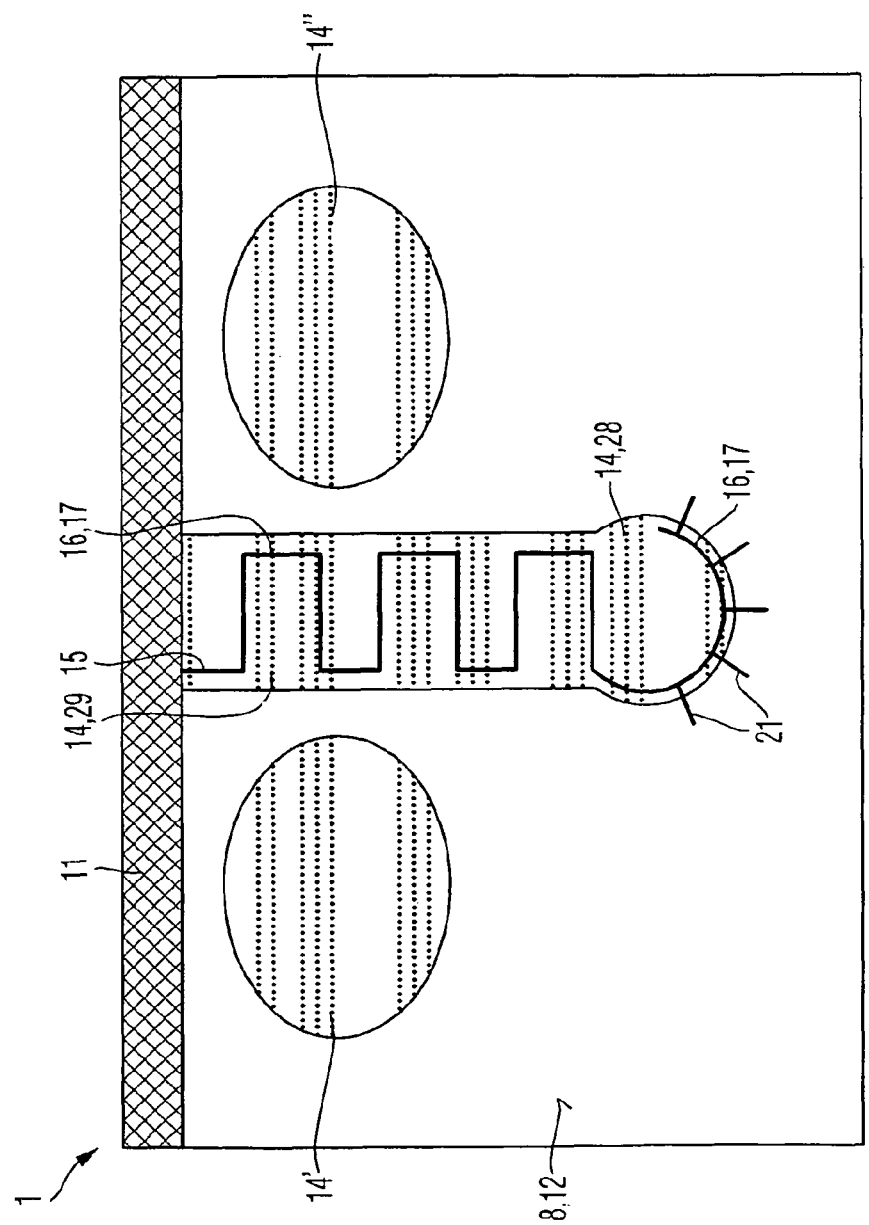

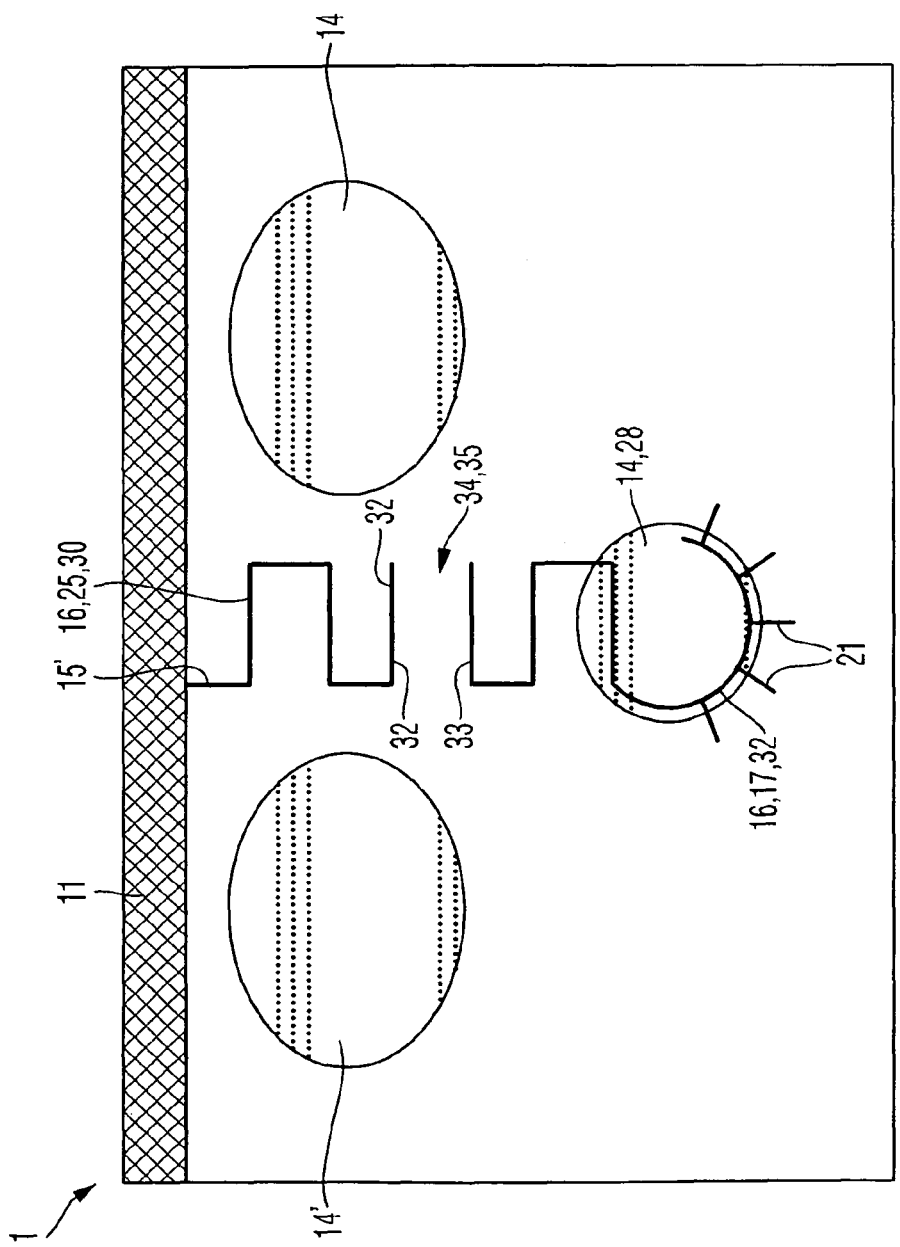

TRANSPARENT PANEL HAVING A HEATABLE COATING

CROSS REFERENCE TO RELATED APPLICATIONS

The present application is the US national stage of International Application PCT/EP2011/064699 filed on Aug. 26, 2011 which, in turn, claims priority to European Patent Applications EP 10175987.6 filed on Sep. 9, 2010 and EP 11169654.8 filed on Jun. 11, 2011. The present application may also be related to U.S. application Ser. No. 13/818,095, filed on Feb. 20, 2013 (Now U.S. Pat. No. 9,100,996), which is the US National stage of International Patent Application PCT/EP2011/064708 filed on Aug. 26, 2011.

The invention relates generically to a transparent pane having an electrically heatable coating according to the preamble of claim 1.

Transparent panes having an electrical heating layer are well known per se and have already been described many times in the patent literature. Merely by way of example, reference is made in this regard to the German published patent applications DE 102008018147 A1 and DE 102008029986 A1. In motor vehicles, they are frequently used as windshields, since, by law, the central visual field must have no vision restrictions, with the exception of heating wires. By means of the heat generated by the heating layer, condensed moisture, ice, and snow can be removed in a short time. Usually, such panes are produced as composite panes, in which two individual panes are bonded to each other by a thermoplastic adhesive layer. The heating layer can be applied on one of the inner surfaces of the individual panes, with, however, other structures also known, wherein the heating layer is situated on a carrier that is disposed between the two individual panes.

The heating layer is usually electrically connected to at least one pair of strip- or band-shaped collecting electrodes ("bus bars"), which are intended to introduce the heating current as uniformly as possible into the coating and to distribute it widely. For an attractive aesthetic appearance of the pane, the opaque bus bars are covered by opaque masking strips.

In general, the specific heating output $P_{spec}$ of a heatable coating can be described by the formula $P_{spec}=U^2/(R_{\square} \cdot D^2)$, where U is the feed voltage, $R_{\square}$ is the electrical sheet resistance of the coating, and D is the distance between the two bus bars. The sheet resistance $R_{\square}$ of the coating is, with the materials currently used in industrial series production, on the order of a few ohms per square unit of area ($\Omega/\square$).

In order to obtain a satisfactory heating output for the desired purpose with the onboard voltage of 12 to 24 volts standardly available in motor vehicles, the bus bars should have the least possible distance D between them. In light of the fact that the resistance R of the heatable coating increases with the length of the current path and since the motor vehicle panes are usually wider than they are high, the bus bars are typically disposed along the top and bottom pane edges such that the heating current can flow via the shorter path of the height of the window pane.

Now, panes with an electrical heating layer block electromagnetic radiation relatively strongly such that, in particular in motor vehicles with a heatable windshield, radio data traffic can be significantly compromised. Heatable windshields are, consequently, frequently provided with coating-free zones ("communications windows or sensor windows"), which are quite permeable at least to certain ranges of the electromagnetic spectrum, to thus enable trouble-free data traffic. The coating-free zones, on which electronic devices, such as sensors and the like, are frequently situated, are commonly disposed in the vicinity of the top pane edge, where they can be well concealed by the upper masking strip.

However, coating-free zones compromise the electrical properties of the heating layer, affecting, at least locally, the current density distribution of the heating current flowing through the heating layer. Actually, they cause a highly inhomogeneous heating output distribution, with the heating output below and in the area surrounding the coating-free zones clearly reduced. On the other hand, sites with a particularly high current density ("hot spots") appear, in which the heating output is highly increased. As a result, very high local pane temperatures can appear, which present a danger of burns and impose great thermal stresses on the panes. In addition, adhesion points of parts mounted thereon can be loosened.

In contrast, the object of the present invention consists in improving generic panes such that the pane is heatable with an at least virtually uniform heating output distribution. This and other objects are accomplished according to the proposal of the invention by a transparent pane with the characteristics of the independent claim. Advantageous embodiments of the invention are indicated by the characteristics of the subclaims.

Generically, the transparent pane comprises an electrically heatable (conductive), transparent coating, which extends at least over a substantial part of the area of the pane, in particular its visual field. The electrically heatable coating is electrically connected to at least two first electrodes provided for electrical connection to the two terminals of a voltage source such that by applying a feed voltage, a heating current flows over a heating field formed between the two first electrodes. For example, the first electrodes are, for this purpose, galvanically connected to the heating layer. Typically, the two first electrodes are implemented, in each case, in the form of a strip- or band-shaped electrode (collecting electrode or collecting rail or bus bar) for the introduction and broad distribution of the current in the heatable coating. For example, the first electrodes are, for this purpose, galvanically connected to the heatable coating. The term "heating field" refers, here, to the heatable part of the electrically heatable coating that is situated between the two first electrodes such that a heating current can be introduced.

In the pane according to the invention, the heating field includes at least one coating-free zone in which no heating layer is present. The coating-free zone is bounded by a zone edge formed at least in sections by the heatable coating. In particular, the coating-free zone has a circumferential zone edge, which is formed (completely) by the heatable coating. The coating-free zone can be produced, for example, by masking at the time of application of the heating layer onto a substrate or by removal of the heatable coating, for example, by mechanical or chemical ablation after its application.

According to the proposal of the invention, the transparent pane is substantially characterized in that it has at least one second electrode ("additional electrode") provided for electrical connection to one terminal of the voltage source, which electrode is disposed at least in sections, in particular with only one electrode section, in the coating-free zone and is electrically connected to the heatable coating such that by applying a feed voltage, a part of the heating current flows over a region or section of the heating field, which is situated between the second electrode or the coating-free zone and the first electrode provided for connection to the other terminal of the voltage source. The second electrode has at least one supply section disposed at least in sections within the coating-free zone and one or a plurality of connection sections connected to the supply section, wherein the connection sections extend, in each case, starting from the coating-free zone, at least beyond an edge section of the zone edge, wherein this edge section is formed by a section of the heating field that is situated between the coating-free zone and the first electrode provided for connection to the other terminal of the voltage source. Thus, the coating-free zone and the first electrode provided for connection to the other terminal of the voltage source are situated on opposite sides of said section of the heating field. Typically, the edge section of the zone edge, beyond which the connection sections extend, are situated opposite or in the immediate vicinity of the first electrode provided for connection to the other terminal of the voltage source. For example, said edge section of the zone edge has an at least approx. linear course that runs parallel to an at least approx. linear section of the first electrode provided for connection to the other terminal of the voltage source. In a, for example, at least approx. rectangular coating-free zone, whose edges are disposed parallel or perpendicular to linear first electrodes, the heating current is introduced, for this purpose, into the heatable coating via the edge section opposite the first electrode. This edge section has a shortest distance to the first electrode provided for connection to the other terminal of the voltage source.

In general, the second electrode is implemented such that the heating current can be introduced (widely) distributed into the heatable coating. The second electrode has, for this purpose, one or preferably a plurality of connection sections that extend beyond the edge of the heatable coating bounding the coating-free zone and that are electrically connected to the electrically heatable coating in order to introduce the heating current (widely) distributed into the coating. The connection sections are, for this purpose, advantageously implemented with free ends, in particular in the form of protrusions, which, preferably, protrude to the first electrode provided for electrical connection to the other terminal of the voltage source. Advantageously, the connection sections are disposed evenly distributed over said edge section, preferably lying next to each other with an equal distance therebetween. The connection sections can be disposed, for example, like the teeth of a comb or like a comb. This measure enables obtaining a particularly uniform introduction of the heating current into the heatable coating. The connection sections can be disposed, in particular, perpendicular to the edge section, beyond which they extend.

Advantageously, in the pane according to the invention, a difference in potential can be established between the second electrode disposed at least in sections in the coating-free zone and the first electrode provided for connection to the other terminal of the voltage source such that the current density distribution of the heating current in the heatable coating is at least virtually homogeneous. Similarly, homogenization of the heating output distribution in the heatable coating can be obtained, by means of which, in particular, sites with reduced or increased heating output (hot spots) can be avoided.

By means of the second electrode disposed at least in sections in the coating-free zone, the heat distribution in the heating layer can be selectively influenced. A particular advantage results from the fact that the second electrode is disposed at least with one electrode section within the coating-free zone such that, there, no heating current fed in by the two first electrodes can flow from the heating layer into the second electrode. Thus, an undesired additional (e.g., local) heating of the second electrode with the risk of formation of hot spots can be avoided. On the other hand, such an effect is typically to be anticipated if the second electrode is, for example, applied to the heating layer around the coating-free zone.

A further advantage of the second electrode disposed at least in sections in the coating-free zone results from the fact that the adhesion of a, for example, metallic printing paste to a, for example, glass substrate is typically better than to the heatable coating. This is true, in particular, for a silver printing paste applied in a printing process, with which particularly good adhesion to glass can be obtained. This enables significant improvement of the durability, in particular, the scratch resistance, of the second electrode.

A further advantage of the second electrode disposed at least in sections in the coating-free zone results from the heating action of the second electrode within the coating-free zone. With such a design of the second electrode, any residue of ice or condensed water in the region of the coating-free zone can be prevented by the heat given off by the second electrode. As already indicated, the second electrode is provided for connection to one terminal of the voltage source, with it being advantageous in this regard for the second electrode to be electrically connected with the first electrode provided for connection to the terminal of the voltage source such that the second electrode requires no separate electrical connection to the voltage source. Alternatively, it would, however, also be possible for the second electrode to have a separate connection to the voltage source. Particularly advantageously, the second electrode and the first electrode provided for connection to one terminal of the voltage source are, for this purpose, implemented in the form of a (single) common electrode such that the second electrode is formed by an electrode section of the first electrode. This measure enables the pane according to the invention to be produced particularly simply from a technical standpoint, in particular by a common or one and the same process step.

In the transparent pane according to the invention, it can be advantageous from a production technology standpoint for the two first electrodes and/or the second electrode to be produced from a metallic printing paste in a printing method, for example, screen printing. This is true, in particular, for the case in which the second electrode is implemented in common with the first electrode provided for connection to one terminal of the voltage source and with the two first electrodes, respectively. Alternatively, it would also be possible to manufacture the two first electrodes and/or the second electrode, in each case, as independent electrical component and to electrically connect them to the heatable coating, for example, by soldering.

The second electrode has at least one supply section connected to the connection sections, which supply section is composed, in one embodiment of the invention, of a coating portion disposed (exclusively) outside the coating-free zone and a zone portion disposed (exclusively) within the coating-free zone. Alternatively, the supply section can consist exclusively of the zone portion such that the supply section is disposed completely within the coating-free zone. The last-mentioned design has the particular advantage that the second electrode can be applied virtually completely on a glass substrate, for example, such that the second electrode has particularly good adhesion to the substrate. In addition, particularly advantageously, currents flowing via the heatable coating between adjacent sections of the supply section can be avoided.

The supply section, in particular, the zone portion disposed within the coating-free zone, of the second electrode advantageously follows at least the edge section (or its contour) of the zone edge, beyond which the connection sections extend, by which means a particularly effective introduction of the heating current into the section of the heatable coating between the coating-free zone and the first electrode provided for connection to the other terminal of the voltage source can be obtained.

For the above-mentioned heating action, it is particularly advantageous for the supply section, in particular the zone portion, to circumferentially follow the zone edge such that, in the region of the complete zone edge, heat can be given off to the coating-free zone. In an embodiment particularly advantageous in this regard, the supply section, in particular, the zone portion is distributed disposed over the coating-free zone, for example, in that the circumferential zone portion is provided with cross-connection sections such that the coating-free zone is particularly effectively heatable by the second electrode.

In the pane according to the invention, the second electrode can also have a plurality of supply sections, which, in each case, have a zone portion disposed within the coating-free zone, wherein each zone portion is connected to one or a plurality of connection sections. This measure enables, particularly simply, the supply section to follow the contour of the coating free zone only in certain edge sections, with, for example, certain edge sections omitted, for instance, because they have a particularly high curvature or there is a very small distance to the first electrode provided for connection to the other terminal of the voltage source, with the result of an undesired high current (uneven heating output distribution) between the second electrode and the first electrode.

Also, the transparent pane can have a plurality of coating-free zones, with which, in each case, a separate second electrode can be associated. Alternatively, the plurality of coating-free zones can be associated in common with a single second electrode, which then has a plurality of zone portions with, in each case, one or a plurality of connection sections.

The electrically heatable coating can consist of one electrically heatable individual layer or of a layer sequence containing such an individual layer. In general, in the pane according to the invention, the electrical resistance of the heatable coating is dimensioned such that by applying a feed voltage, which is, for example, in the range from 12 to 24 volts, a heating output suitable for practical application in the range of, for example, 300 to 1000 watts/m$^2$ is given off by the heating field. The electrical resistance of the heatable coating depends on the material used for the heating layer, for which purpose, for example, silver (Ag) is used. For example, the electrical resistance of the heatable coating is in the range of 0.5 to 4Ω/□. The conductive coating includes an electrically conductive material, typically, a metal or metal oxide. Examples are metals with high electrical conductivity, such as silver (Ag), copper (Cu), gold (Au), aluminum (Al), or molybdenum (Mo), metal alloys such as silver (Ag) alloyed with palladium (Pa), as well as transparent conductive oxides (TCO=Transparent Conductive Oxide). TCOs are preferably indium tin oxide, fluoride-doped tin dioxide, aluminum-doped tin dioxide, gallium-doped tin dioxide, boron-doped tin dioxide, tin zinc oxide, or antimony-doped tin oxide. For example, the conductive coating consists of a metal layer such as a silver layer or a silver-containing metal alloy that is embedded between at least two coatings of dielectric material of the type metal oxide. The metal oxide contains, for example, zinc oxide, tin oxide, indium oxide, titanium oxide, silicon oxide, aluminum oxide, or the like, as well as combinations of one or a plurality thereof. The dielectric material can also contain silicon nitride, silicon carbide, or aluminum nitride. For example, metal layer systems with a plurality of metal layers are used, wherein the individual metal layers are separated by at least one layer made of dielectric material. Very fine metal layers, which contain, in particular, titanium or niobium, can also be provided on both sides of a silver layer. The bottom metal layer serves as a bonding and crystallization layer. The top metal layer serves as a protective and getter layer to prevent a change in the silver during the further process steps.

The conductive coating is, preferably, a transparent coating that is permeable to the electromagnetic radiation, preferably electromagnetic radiation of a wavelength of 300 to 1300 nm, in particular to visible light. The term "permeable" refers here to a total transmission that is, in particular for visible light, for example, >70% and, in particular, >80%. For example, the light transmission of a motor vehicle windshield is approx. 71%. Transparent conductive coatings are known, for example, from the documents DE 202008017611 U1 and EP 0847965 B1.

Advantageously, the layer sequence has high thermal stability such that it withstands the temperatures of typically more than 600° C. necessary for the bending of glass panes without damage; however, even layer sequences with low thermal stability can be provided. Such a layer construction is typically obtained by a succession of deposition procedures. The conductive coating is, for example, deposited out of the gas phase directly onto a substrate, for which purpose methods known per se, such as chemical vapor deposition (CVD) or physical vapor deposition (PVD) can be used. Preferably, the conductive coating is deposited on a substrate by sputtering (magnetron cathode sputtering). However, it is also conceivable to apply the conductive coating first on a plastic film, in particular PET film (PET=polyethylene terephthalate), which is then glued to a substrate.

The thickness of the conductive coating can vary broadly and be adapted to the requirements of the individual case. It is essential that in a transparent flat electrical structure, the thickness of the conductive coating must not be so great that it becomes impermeable to the electromagnetic radiation, preferably electromagnetic radiation of a wavelength of 300 to 1300 nm and, in particular, visible light. For example, the thickness of the conductive coating is at any point in the range from 30 nm to 100 μm. In the case of TCOs, the layer thickness is, for example, in the range from 100 nm to 1.5 μm, preferably in the range from 150 nm to 1 μm and more preferably in the range from 200 nm to 500 nm.

On the other hand, the two first electrodes and the second electrode have, in each case, compared to the heatable coating, a substantially lower electrical resistance. For example, the electrodes have, in each case, an electrical resistance that is in the range from 0.15 to 4 ohms/meter (Ω/m), by means of which it can be achieved that the feed voltage applied drops substantially over the heatable coating such that the electrodes heat up only slightly during operation and a comparatively small share of the available heating output on the electrodes is given off as power dissipation. For example, a relative heating output of the electrodes, based on the heating output of the heatable coating, is less than 5%, in particular, less than 2%. However, alternatively, a substantially higher power dissipation of the second electrode can be provided to obtain adequate heating output for heating the coating-free zone by the second electrode.

A metal such as silver (Ag), in particular in the form of a printing paste for use in the printing method, copper (Cu), aluminum (Al), tungsten (W), and zinc (Zn), or a metal alloy can, for example, be used as electrode material, with this list not being exhaustive. For example, the printing paste includes silver particles and glass frits. For an electrode, made for example from silver (Ag), which is produced by the printing method, the layer thickness is, for example, in the range from 2 to 25 microns (μm), in particular in the range from 5 to 15 μm, for example, in the range from 7 to 15 μm.

In particular, the electrodes can be produced by printing a metallic printing paste onto the conductive coating. Alternatively, it is also possible to use a thin metal foil strip as an electrode, which contains, for example, copper and/or aluminum. For example, an electrical contact between the metal foil strip and the conductive coating can be obtained by an autoclave process through the action of heat and pressure. The electrical contact can, however, also be produced by soldering or gluing with an electrically conductive adhesive.

In general, the electrical resistance of the second electrode can be dimensioned according to the specific requirements of the respective application. It is advantageous according to the invention for the second electrode to have such a resistance that upon application of the feed voltage, such a difference in potential between the second electrode and the first electrode provided for connection to the other terminal of the voltage source occurs that the current density distribution of the heating current in the heatable coating is at least approximately homogeneous. For this purpose, it can be advantageous for the second electrode to have a supply section situated, for example, at least in sections, outside the coating-free zone, whose length, is dimensioned, for example, by a meanderingly curved course, such that the second electrode has a predefinable (selectable) or predefined electrical resistance. Since the electrical resistance rises with an increase in length, the resistance of the second electrode can be modified in a simple manner by a variation in the length of the supply section. The supply section can, in particular, be printed onto the heatable coating. It can be advantageous with regard to an at least approximately current density distribution of the heating current in the heatable coating, if, in particular, through length variation of the supply section, the second electrode has an electrical resistance that corresponds to the electrical resistance that the heatable coating has in a surface area that is the same size as the coating-free zone. This measure can enable obtaining a particularly effective homogenization of the current density distribution in the heating layer. As already indicated, it is advantageous in the pane according to the invention with regard to a homogeneous current density distribution in the heating field, for the second electrode to be implemented such that the heating current is introduced distributed over the edge of the heatable coating bounding the coating-free zone. The second electrode can, for example, be implemented such that the heating current is introduced distributed at least over such an edge section of the heatable coating, that has a shortest distance, in particular a shortest perpendicular distance to the first electrode provided for connection to the other terminal of the voltage source. With an at least approx. rectangular coating-free zone, for example, the heating current can be introduced, for this purpose, for example, over one of the two longer edge sections or one of the two shorter edge sections, depending on which edge section is opposite the first electrode provided for connection to the other terminal of the voltage source.

In another particularly advantageous embodiment of the pane according to the invention, the supply section connected to the connection sections consists of at least two supply parts, (structurally) separated from each other but electrically connected to each other. So, the second electrode is discontinuous on the two supply parts of the supply section, i.e., the two supply parts have no touching contact with each other.

It is essential here that the two supply parts have, in each case, a coupling section, which is electrically connected to the heatable coating, for example, by printing on the heatable coating. Furthermore, the two coupling sections are disposed such that they are galvanically connected to each other through the heatable coating. The term "coupling sections" refers here and in the following to those regions of the two supply parts of the supply section that are, on the one hand, electrically connected to the heatable coating and, on the other, galvanically coupled with each other. This does not, however, preclude that the supply parts, in each case, can also have other sections that are, in fact, electrically connected to the heatable coating, but are not galvanically coupled with the other supply part.

The second electrode thus has no contiguous structure, but is formed by the two supply parts of the supply section separated from each other, and the electrically heatable coating between the two coupling sections, as well as the one or a plurality of connection sections.

The two coupling sections of the supply parts are, for the purpose of a galvanic coupling, disposed (directly) adjacent or abutting each other, with the two coupling sections disposed in juxtaposition and running near each other or opposite each other with a certain distance between them. The distance between the two coupling sections is preferably selected such that the heating current can flow at least virtually without loss from charge carriers through the heatable coating from one coupling section to the other coupling section. For example, the coupling sections have, for this purpose, a distance between them that is in the single-digit centimeter range or less.

To be sure, the electrical power dissipation of the electrodes during the energization with heating current is relatively low, however, a warming of the supply section of the second electrode, in particular in the case that the supply section has a wound shape, cannot be precluded. Thus, local hot sites (hot spots) can possibly appear in the region of the supply section. By means of the division proposed here of the supply section into at least two supply parts separated from each other, the occurrence of such hot spots can advantageously be effectively counteracted since the heating current is distributed over a comparatively large area.

As has already been stated, the two coupling sections are disposed adjacent each other, whereby they can, in particular, have, in each case, an at least approx. linear course parallel to each other, in order to obtain a particularly effective galvanic coupling through the electrically conductive coating.

In particular, one of the two coupling sections ("first coupling section") can be connected to the first electrode provided for connection to the one terminal of the voltage source and the other coupling section ("second coupling section") can be connected to the one or a plurality of connection sections. This measure enables a technically particularly simple realization of the divided second electrode.

Preferably, the electrodes of the transparent pane are produced in the printing method, for example, the screen printing method, which enables a technically particularly simple, economical, and reliable manufacture, in particular, of the two separated, but galvanically coupled supply parts.

The pane according to the invention can, for example, be implemented as so-called single-plane safety glass (SPSG) with only one substrate or as a composite pane with, as a rule, two substrates bonded to each other by a thermoplastic adhesive layer. The substrate is made, for example, of a glass material, such as float glass, quartz glass, borosilicate glass, soda lime glass, cast glass, or ceramic glass, or of a non-glass material, for example, plastic, such as polystyrene (PS), polyamide (PA), polyester (PE), polyvinyl chloride (PVC), polycarbonate (PC), polymethyl methacrylate (PMA), or polyethylene terephthalate (PET), and/or mixtures thereof. Examples of suitable glasses can be found, for example, in European Patent EP0847965 B1. In general, any material with sufficient chemical resistance, suitable shape and size stability, as well as, optionally, adequate optical transparency can be used. Depending on the application, the thickness of the substrate can vary widely. For a heatable, transparent glazing, the thickness of the substrate is, for example, in the range from 1 to 25 mm, whereas, typically, for transparent panes, a thickness of 1.4 to 2.1 mm is used. The substrate is planar or curved in one or a plurality of spatial directions. In the case of a composite pane, the heatable coating is disposed on at least one surface, for example, on the surface of the inner pane facing the outer pane and/or on a surface of a carrier disposed between the two individual panes. For example, the pane according to the invention is implemented in the form of a motor vehicle windshield, with the coating-free zone disposed, for example, adjacent or in the vicinity of a top pane edge of the windshield in the installed state, by means of which a simple concealment of the coating-free zone is possible using an opaque cover element implemented, for example, as a black screen-printed edge.

The invention further extends to a method for producing a transparent pane, in particular, as stated above. The method comprises the following steps:

producing an electrically heatable coating, which extends at least over a substantial part of the area of the pane;

forming at least two first electrodes provided for electrical connection to the two terminals of a voltage source, which electrodes are electrically connected to the heatable coating such that by applying a feed voltage, a heating current flows over a heating field situated between the two first electrodes;

producing at least one coating-free zone in the heating field, which is bounded by a zone edge formed at least in sections by the heatable coating;

producing at least one second electrode provided for electrical connection to one terminal of the voltage source, which electrode runs at least in sections in the coating-free zone and is electrically connected to the heatable coating such that a part of the heating current flows over a section of the heating field that is situated between the second electrode and the first electrode provided for connection to the other terminal of the voltage source. The second electrode is produced such that it has at least one supply section disposed at least in sections within the coating-free zone and one or a plurality of connection sections, wherein the connection sections extend, in each case, starting from the coating-free zone, beyond an edge section of the zone edge, wherein the edge section is formed by a section of the heating field, which is situated between the coating-free zone and the first electrode provided for connection to the other terminal of the voltage source.

In an advantageous embodiment of the method according to the invention, the second electrode is implemented such that the supply section consists of at least two supply parts separated from each other, which have, in each case, a coupling section electrically connected to the heatable coating, wherein the two coupling sections are disposed opposite one another such that they are galvanically coupled by the heatable coating.

In another advantageous embodiment of the method according to the invention, the second electrodes and the first electrode provided for electrical connection to one terminal of the voltage source are produced in common, for example, by printing, in particular, screen printing. In particular, the second electrode can also be produced in common with the two first electrodes.

The invention further extends to the use of a pane as described above as a functional and/or decorative individual piece and as a built-in part in furniture, devices, and buildings, as well as in means of transportation for travel on land, in the air, or on water, in particular in motor vehicles, for example, as a windshield, rear window, side window, and/or glass roof. Preferably, the pane according to the invention is implemented as a motor vehicle windshield or a motor vehicle side window.

It is understood that the aforementioned characteristics and those to be explained in the following can be used not only in the combinations indicated, but also in other combinations or alone, without departing from the scope of the present invention.

BRIEF DESCRIPTION OF THE DRAWINGS

The invention is now explained in detail using exemplary embodiments with reference to the accompanying figures. They depict, in simplified, not to scale representation:

FIG. 3-8 different variants of the windshield of FIG. 1;

FIG. 12 a variant of the windshield of FIG. 7.

DETAILED DESCRIPTION OF THE DRAWINGS

Figure 1:
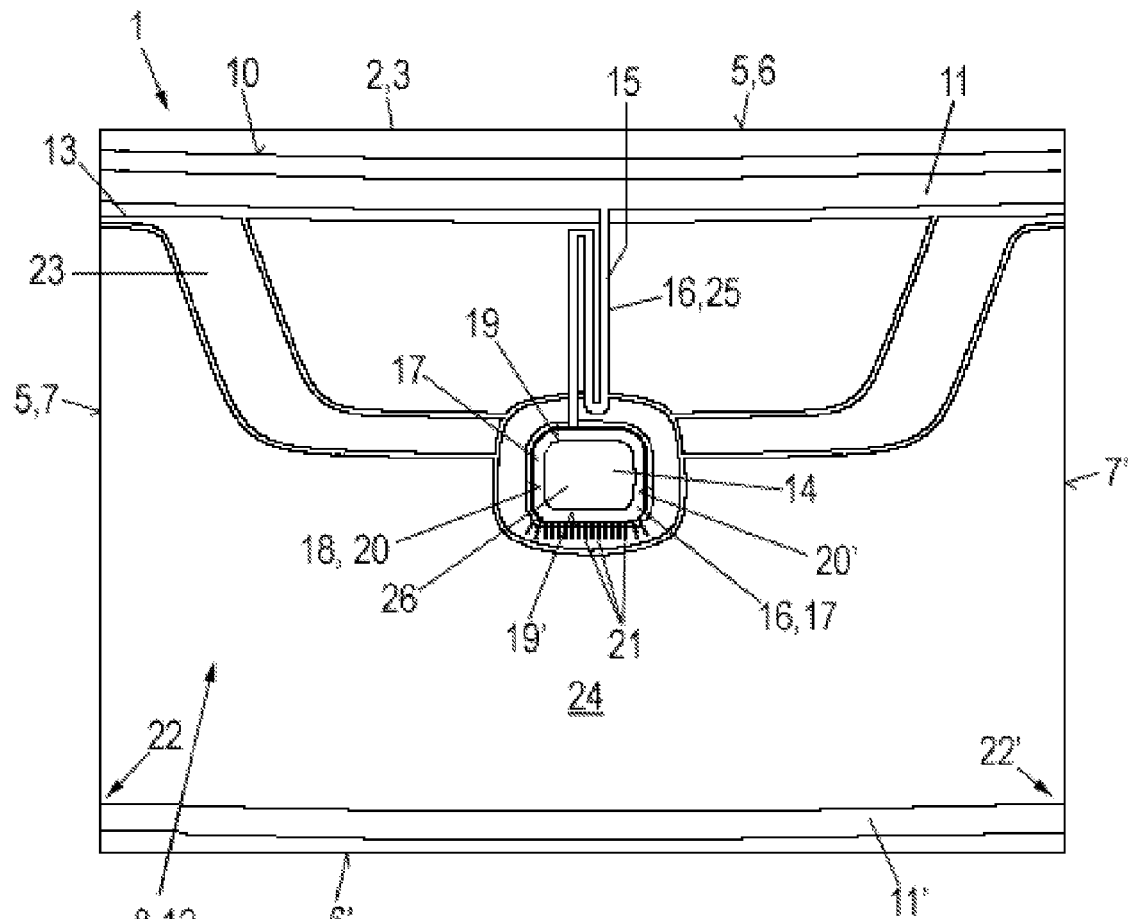
FIG. 1 a top view of an exemplary embodiment of the windshield according to the invention.
Figure 2:
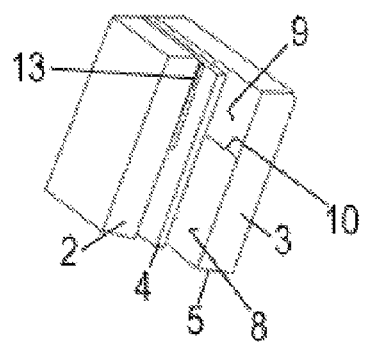
FIG. 2 a perspective cross-sectional view of a detail of the windshield of FIG. 1.

Reference is first made to FIGS. 1 and 2, in which a transparent windshield of a motor vehicle, referred to as a whole by the reference character 1, is depicted. FIG. 1 presents a view of the windshield 1 from the inside. The windshield 1 is implemented here, for example, as a composite pane, whose construction is discernible in the perspective sectional view of FIG. 2.

According to it, the windshield 1 comprises two rigid individual panes, namely, an outer pane 2 and an inner pane 3, which are fixedly bonded to each other by a thermoplastic adhesive layer 4, in this case, for example, a polyvinyl butyral film (PVB), ethylene vinyl acetate film (EVA), or polyurethane film (PU). The two individual panes 2, 3 are approximately the same size and shape and can, for example, have a trapezoidal curved contour, which is not depicted in detail in the figures. They are, for example made of glass, but can also be produced from a non-glass material, such as plastic. For applications other than as a windshield, it would also be possible to produce the two individual panes 2, 3 from a flexible material. The contour of the windshield 1 is defined by a pane edge 5 common to the two individual panes 2, 3, with the windshield 1 having, at the top and bottom, two opposing first sides 6, 6' as well as, on the left and on the right, two opposing second sides 7, 7'.

As depicted in FIG. 2, a transparent, electrically heatable coating 8 is deposited on the side of the inner pane 3 bonded to the adhesive layer 4. Here, the heatable coating 8 is, for example, applied substantially on the entire surface of the inner pane 3, with an edge strip 9 of the inner pane 3 circumferential on all sides not coated such that a coating edge 10 of the heatable coating 8 is set back inward relative to the pane edge 5. This effects electrical isolation of the heatable coating 8 toward the outside. In addition, the heatable coating 8 is protected against corrosion penetrating from the pane edge 5.

The heatable coating 8 comprises, in a manner known per se, a layer sequence (not shown in detail) with at least one electrically heatable, metallic sublayer, preferably silver (Ag), and, optionally, other sublayers such as anti-reflection layers and blocker layers. The layer sequence advantageously has high thermal stability such that it withstands, without damage, the temperatures of typically more than 600° C. necessary for the bending of glass panes; however, layer sequences with low thermal stability can also be provided. The heatable coating 8 can also be applied as a metallic single layer. It is also conceivable not to apply the heatable coating 8 directly on the inner pane 3, but instead to apply it first on a carrier, for example, a plastic film that is subsequently bonded with the outer and inner pane 2, 3. Alternatively, the carrier film can be bonded to adhesive films (e.g., PVB films) and bonded as a three layer arrangement (trilayer) to inner and outer pane 2, 3. The heatable coating 8 is preferably applied by sputtering over magnetron cathode sputtering onto the inner or outer pane 2, 3.

As depicted in FIG. 1, the heatable coating 8 is electrically connected adjacent the two first sides 6, 6', i.e., at the top and bottom pane edge 5, to a band-shaped top collecting electrode 11 (bus bar) and a band-shaped bottom bus bar 11' (referred to in the introduction of the description as "first electrodes") and, for example, for this purpose, galvanically coupled to the two bus bars 11, 11'. The top bus bar 11 is provided for connection to one terminal of a voltage source (not shown), whereas the bottom bus bar 11' is provided for connection to the other terminal of the voltage source. The two bus bars 11, 11' of opposite polarity serve for uniform introduction and distribution of the heating current in the heatable coating 8, with a heatable section or heating field 12 enclosed between the two bus bars 11, 11'. The two first electrodes 11, 11' are, for example, printed onto the electrically heatable coating 8. The two bus bars 11, 11' have, in each case, an at least approx. linear course.

The windshield 1 is further provided with a coating-free zone 14, which serves here, for example, as a sensor window for a rain sensor. It is understood that the coating-free zone 14 can also be provided for a different use, for example, as a communication window, for which purpose, it is permeable at least to a part of the electromagnetic spectrum in order to enable trouble-free data traffic through the windshield.

The coating-free zone 14 has, for example, here, an at least approx. rectangular contour with rounded corners and is bounded by a zone edge 18 formed by the electrically heatable coating 8. The coating-free zone 14 is permeable at least to a part of the electromagnetic spectrum (e.g., IR-waves, radio waves in the ultrashort, short, and longwave range) in order to enable trouble-free data traffic through the windshield 1. The coating-free zone 14 can, for example, be produced by masking prior to application of the heatable coating 8 on the inner pane 3. Alternatively, it can also be produced after application of the heatable coating 8 by chemical or mechanical ablation, for example, by means of etching or use of a friction wheel. The coating-free zone 14 is situated within the heating field 12 in the vicinity of the top bus bar 11.

As depicted in FIG. 1, an additional electrode 15 (referred to in the introduction of the description as "second electrode") is provided in the windshield 1, which is, for example, electrically (galvanically) connected here to the top bus bar 11. The additional electrode 15 can, at least theoretically, be divided into various sections. Thus, the additional electrode 15 includes a supply section 16 electrically connected to the top bus bar 11, which here has, for example, at the beginning in one coating portion 25 a meanderingly curved course and, then, transitions into a circumferential, at least approx. ring-shaped zone portion 17. Whereas the coating portion 25 is situated completely in the region of the heatable coating 8, the zone portion 17 is disposed completely within the coating-free zone 14. The zone portion 17 is implemented, for example, at least approx. congruent to the contour of the zone edge 18. Thus, within the zone portion 17 of the supply section 16, a free area or electrode window 26 bounded by the zone portion 17 is formed such that the function of the coating-free zone 14 is not compromised by the additional electrode 15.

The zone edge 18 bounding the coating-free zone 14 is composed of two opposing, at least approx. straight first edge sections 19, 19', which lie parallel to the first sides 6, 6' of the windshield 1, and two opposing, at least approx. straight second edge sections 20, 20', which lie parallel to the second sides 7, 7' of the windshield 1. In particular, a top first edge section 19 is disposed closer to the top bus bar 11 than to the bottom bus bar 11', whereas a bottom first edge section 19' is disposed closer to the bottom bus bar 11' than to the top bus bar 11. In particular, the bottom first edge section 19' runs parallel to the bottom bus bar 11', which is provided for connection to the other terminal of the voltage source.

The additional electrode 15 further has a plurality of linear running connection sections 21, which are implemented, in each case, as a protrusion of the ring-shaped zone portion 17 of the supply section 16. Here, the connection sections 21 are distributed disposed (only) in the region of the bottom first edge sections 19'. The connection sections 21 are disposed in uniform succession (equal distance between them) row-like or comb-like next to each other, protrude, in each case, perpendicular to the bottom first edge section 19' toward the bottom bus bar 11', and extend, in each case, all the way to the heatable coating 8 such that they are electrically (galvanically) connected thereto. The connection sections 21 thus extend beyond the bottom first edge section 19'. On the two ends of the row, the connection sections 21 are slightly inclined toward the second sides 7 of the windshield 1, being pointed roughly toward the left bottom corner region 22 or the right bottom corner region 22' of the windshield 1. The connection sections 21 are disposed evenly distributed over the complete length of the bottom first edge section 19' and thus enable uniform introduction and (wide) distribution of the heating current in the bottom region of the heating coating-free zone 14 into the heatable coating 8.

The two band-shaped bus bars 11, 11' are produced here, for example, by printing, for example, using screen printing methods, a metallic printing paste, for example, silver printing paste, onto the heatable coating 8. The additional electrode 15 can equally be produced as a band-shaped electrode by printing onto the heatable coating 8 and the coating-free zone 14, with the two bus bars 11, 11' and the additional electrode 15 produced here, for example, in a common (same) process or printing step. Alternatively, it would also be possible to produce the bus bars 11, 11' and/or the additional electrode 15 through the application of prefabricated metal strips made, for example, of copper or aluminum, which are then electrically connected, for example, by soldering to the heatable coating 8.

The two bus bars 11, 11' and the additional electrode 15 have here, for example, an electrical resistance in the range from 0.15 to 4 ohm/meter ($\Omega$/m). The specific resistance is, in particular, for bus bars 11, 11' produced in the printing method, for example, in the range from 2 to 4 µohm·cm. The width of the two band-shaped bus bars 11, 11' is, for example, 10 to 15 mm. The width of the band-shaped additional electrode 15 is, for example, less than 10 mm and is, for example, 1 to 10 mm. The width of the two bus 11, 11' and the additional electrode 15 is dimensioned, for example, such that they, in each case, give off a maximum of 10 W/m, preferably a maximum of 8 W/m, for example, 5 W/m, as power dissipation. The thickness of the two bus bars 11, 11' and the additional electrode 15 is, for example, in each case, in the range from 5 to 25 µm, in particular in the range from 10 to 15 µm. A cross-sectional area of the two bus bars 11, 11' and the additional electrode 15 is, for example, in each case, in the range from 0.01 to 1 mm$^2$, in particular in the range from 0.1 to 0.5 mm$^2$.

For prefabricated band-shaped bus bars 11, 11' made, for example, of copper (Cu), and correspondingly implemented additional electrode 15, the thickness is, for example, in the range from 30 to 150 µm, in particular in the range from 50 to 100 µm. In this case, the cross-sectional area is, for example, in the range from 0.05 to 0.25 mm$^2$.

Preferably, the additional electrode 15 in the windshield 1 has an electrical resistance such that upon applying the feed voltage, the heating current flowing through the heating field 12 has an at least virtually homogeneous current density distribution. The electrical resistance of the additional electrode 15 can be adjusted, in a simple manner, through the length of the supply section 16, in particular of the coating portions 25, to a freely selectable pre-definable or predefined resistance value, for which purpose, the supply section 16 here has, for example, a meandering course; however, a different course can equally be realized.

The electrical sheet resistance of the heatable coating 8 is, for example, selected such that the current flowing through the heating field 12 has a maximum magnitude of 5A. For example, the electrical sheet resistance of the heatable coating 8 is in the range from 0.1 to 4$\Omega$/$\square$ and is, for example, 1$\Omega$/$\square$.

The surface of the outer pane 2 facing the inner pane 3 is provided with an opaque color layer that forms a frame-shaped circumferential masking strip 13 on the pane edge 5. In FIG. 1, the masking strip 13 is depicted only in the region of the two first sides 6, 6' of the windshield 1. The masking strip 13 is made, for example, from an electrically insulating, black-colored material that is baked into the outer pane 2. On the one hand, the masking strip 13 prevents seeing an adhesive strand (not shown), with which the windshield 1 is glued into the motor vehicle body; on the other, it serves as UV protection for the adhesive material used. Moreover, the masking strip 13 defines the visual field of the windshield 1. A further function of the masking strip 13 is to conceal the two bus bars 11, 11' such that they are not discernible from the outside. On the top pane edge 5, the masking strip 13 further has a cover section 23, by which the coating-free zone 14 is concealed.

In the windshield 1 with a heatable coating 8, a heating current can thus be generated in the heating field 12 by applying a feed voltage to the two bus bars 11, 11'. By applying the feed voltage, a difference in potential between the additional electrode 15 and the bottom bus bar 11' is simultaneously generated such that a part of the heating current flows through a heating field section 24, which is enclosed between the additional electrode 15 or the coating-free zone 14 and the bottom bus bar 11'. In the region of the coating-free zone 14, the heating current is introduced evenly distributed into the heatable coating 8 over the bottom first edge section 19', which is immediately adjacent the bus bar 11' to be connected to the other terminal of the voltage source. The (internal) electrical resistance of the additional electrode 15 generates, with the applied feed voltage, such a difference in potential between the additional electrode 15 and the bottom bus bar 11' that the current density distribution of the heating current is at least virtually homogeneous in the complete heatable coating 8. This advantageously enables homogenization of the heating output distribution in the heatable coating 8.

FIGS. 3 to 8 illustrate different variants of the windshield 1 of FIG. 1. In order to avoid unnecessary repetitions, only the differences relative to the windshield 1 of FIG. 1 are explained and reference is otherwise made to the statements made regarding FIGS. 1 and 2. In FIGS. 3 to 8, for the purpose of a simpler representation, the windshield 1 is shown, in each case, only as a detail in a top region.

Figure 3:
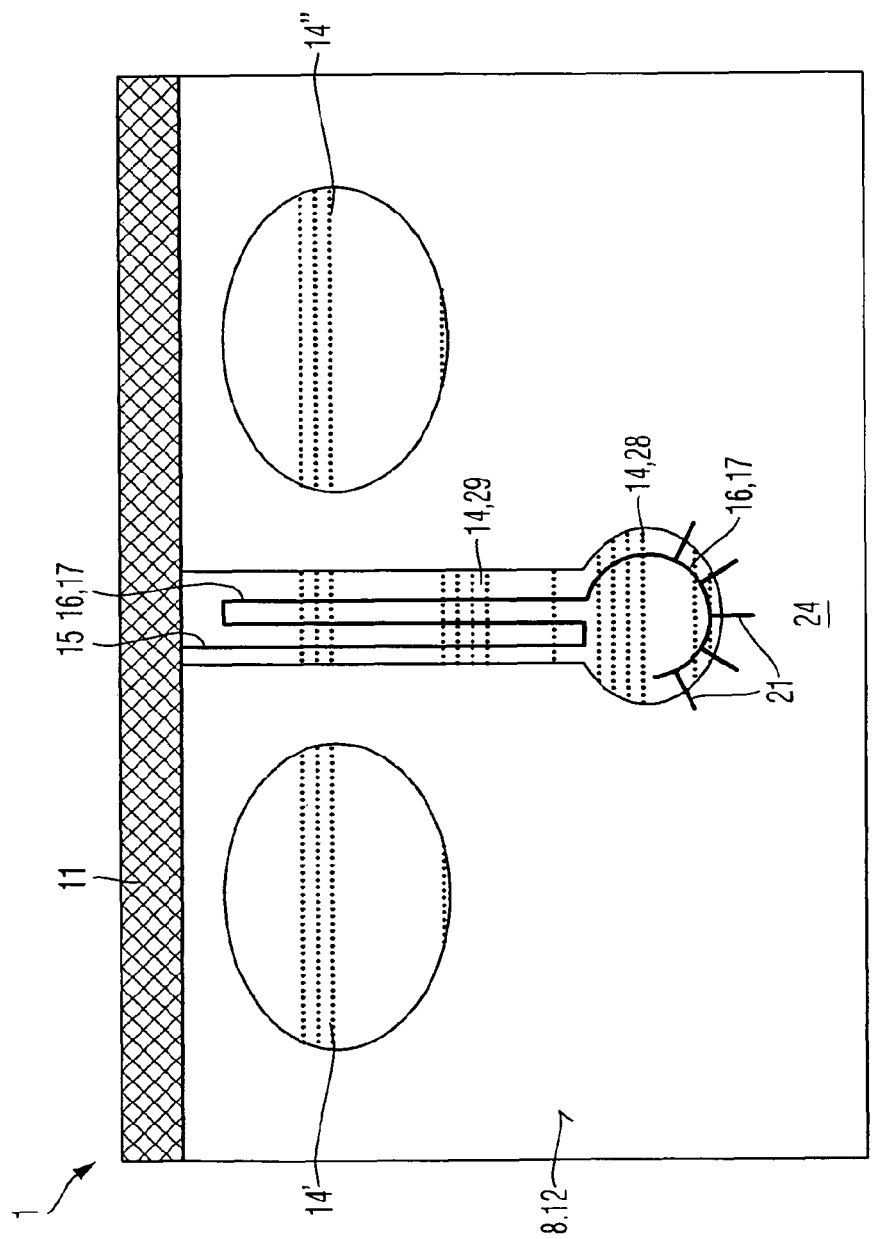

FIG. 3 illustrates a variant in which the supply section 16 of the additional electrode 15 is meanderingly curved and consists of the zone portion 17 disposed completely within the coating-free zone 14. The coating-free zone 14 comprises a round first zone section 28 and a rectangular second zone section 29 connected thereto, which extends to the bus bar 11 provided for connection to one terminal of the voltage source. The meandering tracks of the zone portion 17 extend, in each case, between the bus bar 11 and the circular first zone section 28 and change their course direction in a direction perpendicular thereto. Except for the connection sections 21, which extend beyond the zone edge 18 and are electrically connected to the heatable coating 8, the additional electrode 15 is thus situated completely within the coating-free zone 14. On the one hand, this enables obtaining a particularly good adhesion of the additional electrode 15, for example, on the glass inner pane 3. On the other, electrical currents between adjacent parts of the supply section 16 conducted via the heatable coating 8 can be prevented. Such currents can occur, in particular, in case of relatively large voltage differences between adjacent parts of the supply section 16, if the additional electrode 15 is applied on the heatable coating 8. Moreover, with this variant, it is possible to prevent currents introduced from the two bus bars 11, 11' into the heatable coating 8 flowing from the heatable coating 8 to the supply section 16 and resulting there in undesired additional (possibly local) heating with the risk of hot spots. Here, the zone portion 17 is not implemented as a complete ring but forms only a partial ring, which follows the contour of the zone edge 18 of the coating-free zone 14, in particular in a round edge section 27, which is formed by a heating field section 24 that is situated between the additional electrode 15 or coating-free zone 14' and the bus bar 11' provided for connection to the other terminal of the voltage source. The windshield 1 has further coating-free zones 14', 14", oval shaped here, for example, with which, in the present example, no additional electrode 15 is associated, but which could likewise be provided with an additional electrode 15.

Figure 4:
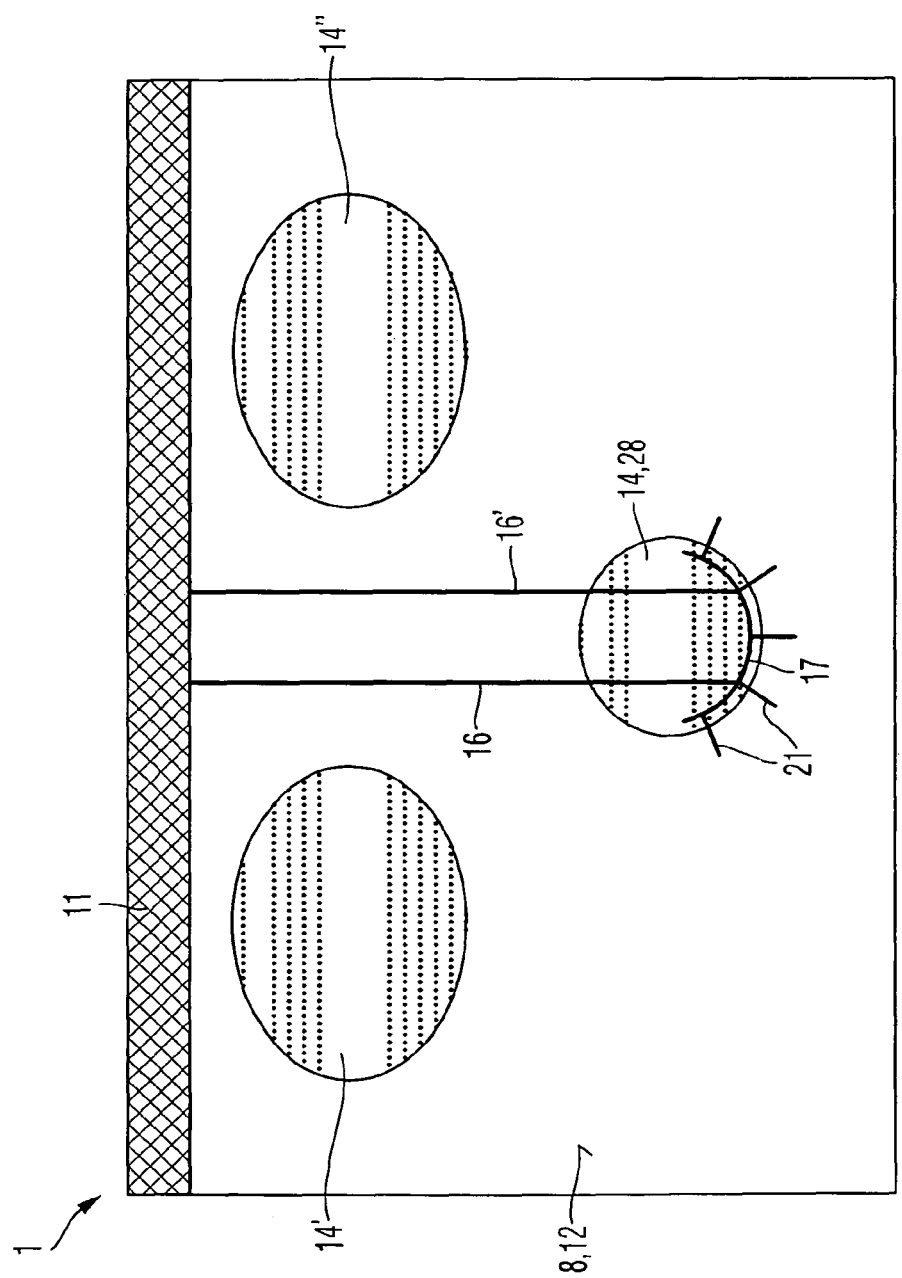

FIG. 4 illustrates another variant, which differs from the variant of FIG. 3 in that the additional electrode 15 has two supply sections 16, 16' that have a common zone portion 17. The common zone portion 17 follows the contour of the zone edge 18, in particular, in the round edge section 27, which is formed by a heating field section 24 that is situated between the additional electrode 15 or coating-free zone 14' and the bus bar 11' provided for connection to the other terminal of the voltage source. The coating-free zone 14 consists only of the circular first zone section 28, such that the two supply sections 16, 16' run in sections on the heatable coating 8.

Figure 5:
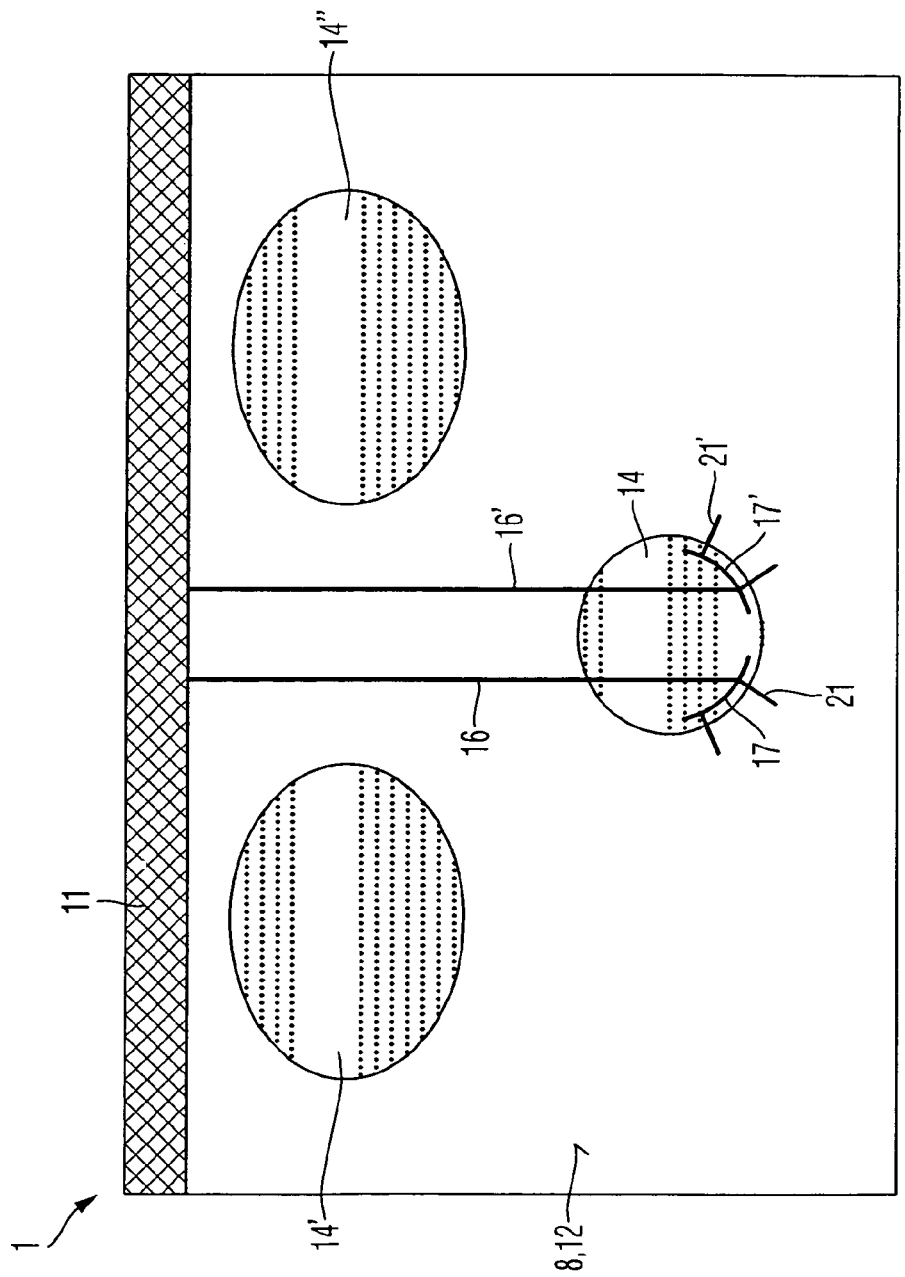

The variant illustrated in FIG. 5 differs from the variant shown in FIG. 4 only in that the common zone portion 17 is discontinuous such that two additional electrodes 15, 15' separated from each other are formed, which have, in each case, a separate supply section 16, 16' and connection sections 21, 21' connected thereto. This measure enables introducing a heating current through the additional electrodes 15, 15' into the heating coating 8 only in selective sections of the zone edge 18. This can, for example, be advantageous when the heating current introduced is undesirably high due to a very short distance to the bus bar 11'. It can likewise be advantageous to introduce no heating current through the additional electrode 15 in a region (not shown) of comparatively high curvature of the zone edge 18.

Figure 6:
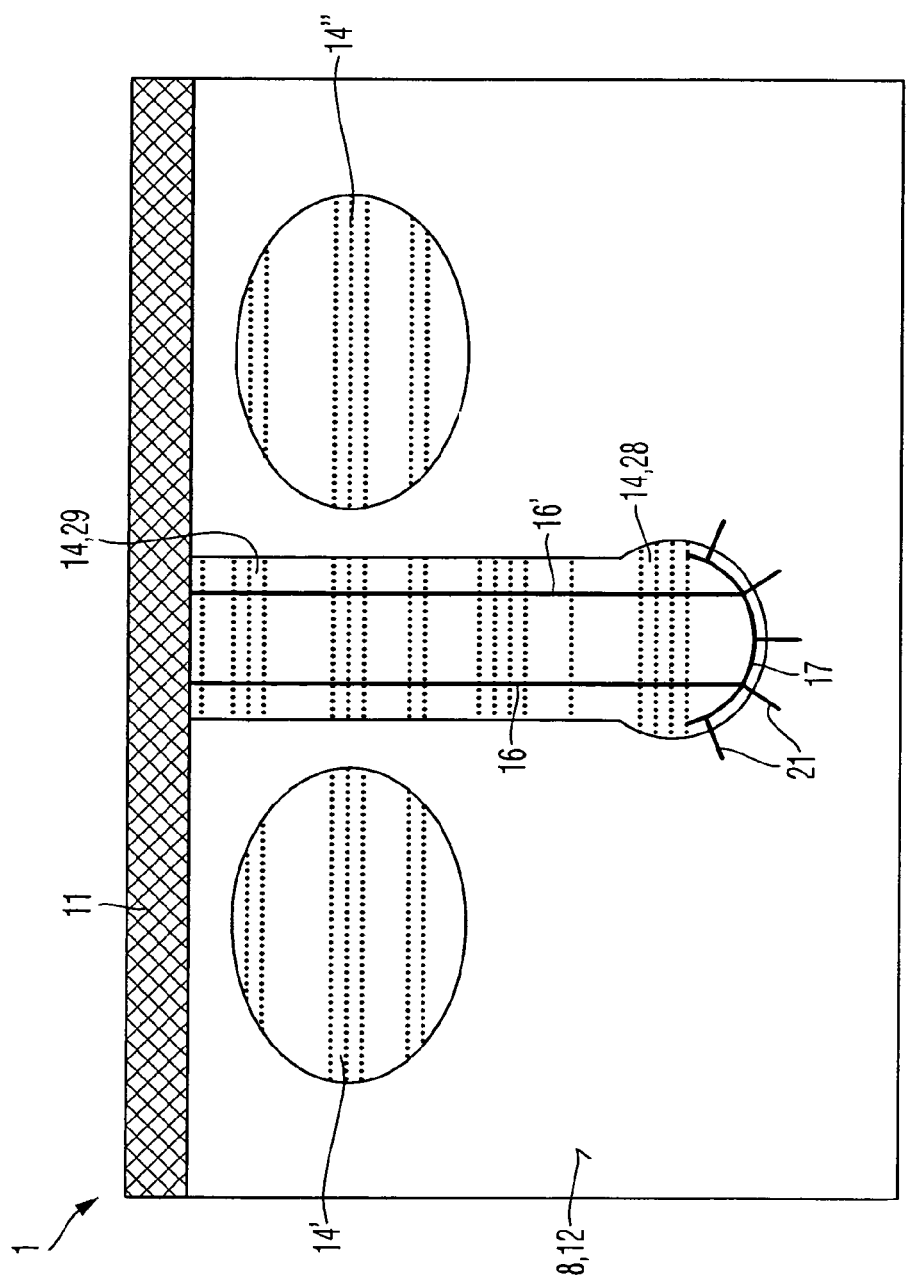

The variant illustrated in FIG. 6 differs from the variant shown in FIG. 4 in that the coating-free zone 14 comprises the circular first zone section 28 and the rectangular second zone section 29 connected thereto, which extends to the bus bar 11 provided for connection to one terminal of the voltage source. The advantages of such a design have already been explained in the variant of FIG. 3.

The variant illustrated in FIG. 7 differs from the variant shown in FIG. 3 in that the coating-free zone 14 consists only of the circular first zone section 28. In addition, the meandering tracks of the zone portion 17 extend, in each case, at right angles to a connection between the bus bar 11 and to the circular first zone section 28 and change their course direction along a path between the bus bar 11 and the circular first zone section 28. This enables realization of relatively large distances between adjacent regions of the supply section 16, whereby, in particular, when relatively high voltages are present between adjacent regions of the supply section 16, currents conducted by the heatable coating 8 between these regions can be prevented.

The variant illustrated in FIG. 8 differs from the variant shown in FIG. 6 in that the coating-free zone 14 comprises the circular first zone section 28 and the rectangular second zone section 29 connected thereto, which extends to the bus bar 11 provided for connection to the one terminal of the voltage source. The advantages of such a design have already been explained in the variant of FIG. 3.

Figure 9A:
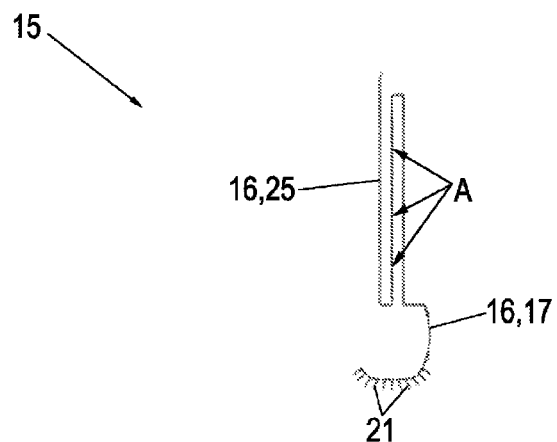
FIG. 9A-9B another variant of the windshield of FIG. 1 with a discontinuous supply section.

FIG. 9A depicts another variant of the windshield of FIG. 1, wherein, as a variant, the zone portion 17 17 is not circumferentially closed, but, instead, is implemented only in the region of one (right, in this case) second edge section 20' and bottom first edge section 19'. It has been demonstrated in practice that in the meanderingly curved coating portion 25 of the supply section 16 situated on the heatable coating 8, under certain conditions, the possibility exists that, in particular, in the region identified by "A", a higher temperature is present than in the heating field 12. This can be undesirable, in particular, with regard to customer requirements.

Figure 9B:
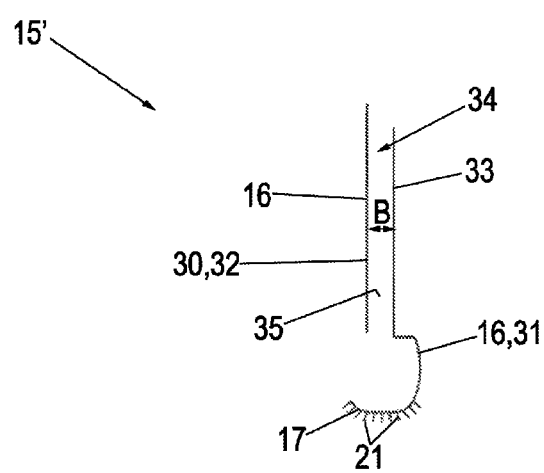

A measure for prevention of such local overheating is illustrated in FIG. 9B. According to it, the supply section 16 of the additional electrode 15' is discontinuous and divided into two regions spatially (structurally) separate from each other, i.e., not connected to each other by the same electrode material. Thus, the supply section 16 comprises a first supply part 30 and a second supply part 31 separate therefrom. The first supply part 30 is connected to the (top) first bus bar 11 provided for connection to the one terminal of the voltage source. The second supply part 31 comprises the zone portion 17, from which the connection sections 21 protrude. In addition, the first supply part 30 includes a first coupling section 32; the second supply part 30 includes second coupling section 33, which are, in each case, electrically connected to the electrically conductive heatable coating 8, for example, by printing on to the coating 8. Each of the two coupling sections 32, 33 has an at least approx. linear course, with the two coupling sections 32, 33 running close to each other in parallel alignment directly adjacent each other in a coupling zone 34. A distance B between the two coupling sections 32, 33 in the coupling zone 34 is selected such that the two coupling sections 32, 33 are galvanically connected (coupled) by the electrically heatable coating 8. When the (top) bus bar 11 provided for connection to the one terminal of the voltage source is impinged on by a heating voltage, the heating current can be transferred between the two coupling sections 32, 33 by the heatable coating 8 situated between the two coupling sections 32, 33. The coating 8 thus forms a current transfer zone 35 between the two coupling sections 32, 33 for current transfer between the two coupling sections 32, 33. A distance B between the two coupling sections 32, 33 is preferably selected such that the current can be transferred virtually without loss on charge carriers between the two coupling sections 32, 33. Here, the distance B is, for example, in the single-digit centimeter range or less.

Figure 10:
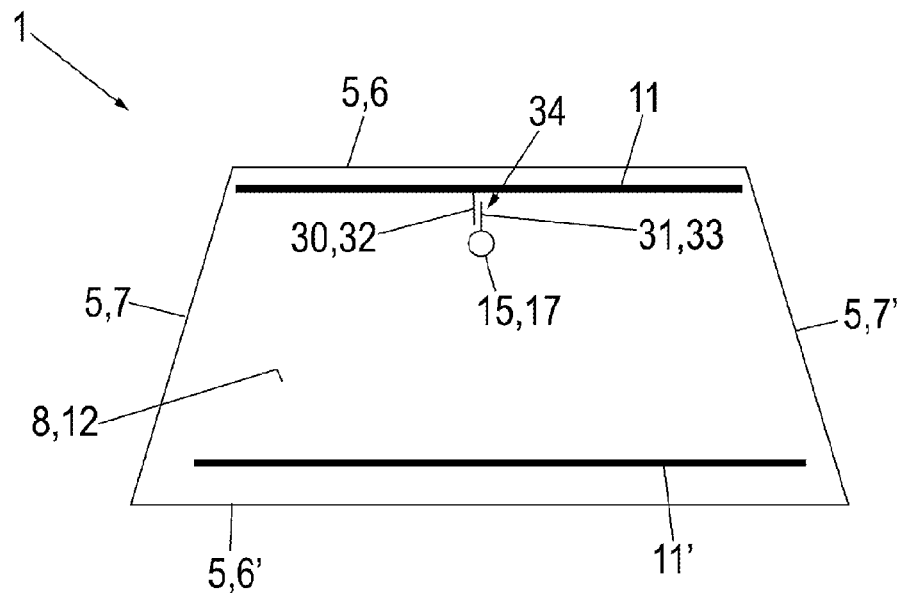
FIG. 10-11 variants of the windshield of FIGS. 9A and 9B.

FIG. 10 illustrates, using a schematic depiction, the divided additional electrode 15' of FIG. 9B in the installed state, with the windshield 1 identical in structure to the windshield 1 illustrated in FIGS. 1 and 2, with the exception of the divided additional electrode 15'. In order to avoid unnecessary repetitions, reference is made in this regard to the statements made there. In contrast to FIG. 9B, the additional electrode 15' includes a ring-shaped closed zone portion 17 in the supply section 16. The connection sections 21 are not depicted for the purpose of a simpler representation. The two linear coupling sections 32, 33 are disposed such that they have a course perpendicular to the two linear bus bars 11, 11', at least approx. parallel to each other.

Figure 11:
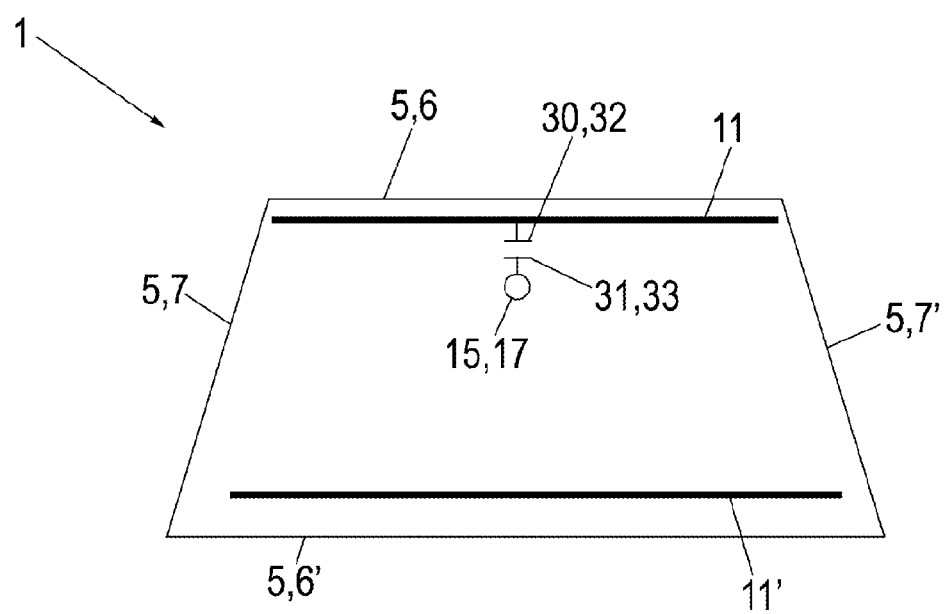

FIG. 11 depicts a variant of FIG. 10, in which only the two coupling sections 32, 33 are disposed opposite each other and extend parallel to each other as well as parallel to the two linear bus bars 11, 11'.

The variant illustrated in FIG. 12 differs from the variant shown in FIG. 7 in that the supply section 16 of the additional electrode 15' is discontinuous and divided into two regions spatially (structurally) separated from each other, i.e. not connected to each other by the same electrode material. The supply section 16 comprises a first supply part 30 and a second supply part 31 separate therefrom. The first supply part 30 is connected to the (top) first bus bar 11 provided for connection to the one terminal of the voltage source. The second supply part 31 comprises the zone portion 17, from which the connection sections 21 protrude.

The first supply part 30 includes a first coupling section 32; the second supply part 30 includes a second coupling section 33, which are, in each case, electrically connected to the electrically conductive heatable coating 8. Each of the two coupling sections 32, 33 has an at least approx. linear course, with the two coupling sections 32, 33 running close to each other in parallel alignment directly adjacent each other in a coupling zone 34. The two coupling sections 32, 33 are galvanically connected (coupled) in the coupling zone 34 by the electrically heatable coating 8. The coating 8 thus forms a current transfer zone 35 between the two coupling sections 32, 33 for the current transfer between the two coupling sections 32, 33. The two coupling sections 32, 33 are disposed opposite each other and extend parallel to the two linear bus bars 11, 11'.

LIST OF REFERENCE CHARACTERS 1 windshield
2 outer pane
3 inner pane
4 adhesive layer
5 pane edge
6, 6' first side
7, 7' second side
8 coating
9 edge strip
10 coating edge
11, 11' bus bar
12 heating field
13 masking strip
14, 14', 14" coating-free zone
15, 15' additional electrode
16, 16' supply section
17, 17' zone portion
18 zone edge
19, 19' first straight edge section
20, 20' second straight edge section
21, 21' connection section
22, 22' corner region
23 cover section
24 heating field section
25 coating portion
26 electrode window
27 round edge section
28 first zone section
29 second zone section
30 first supply part
31 second supply part
32 first coupling section
33 second coupling section
34 coupling zone
35 current transfer zone

The invention claimed is:

1. A transparent pane comprising:
an electrically heatable coating electrically connected to at least two first electrodes provided for electrical connection to two terminals of a voltage source such that by applying a feed voltage, a heating current flows over a heating field formed between the at least two first electrodes,
wherein the heating field includes at least one coating-free zone, which is bounded by a zone edge formed by the electrically heatable coating, characterized by at least one second electrode provided for electrical connection to one of the two terminals of the voltage source, the at least one second electrode having at least one supply tract disposed at least partially in the at least one coating-free zone and at least one electrode trace connected to the at least one supply tract, and
wherein the at least one electrode trace extends starting from the at least one coating-free zone, beyond an edge of the zone edge, the edge being formed by a part of the heating field that is situated between the at least one coating-free zone and the at least two first electrodes provided for connection to a second one of the two terminals of the voltage source,
wherein:
the at least one second electrode has a resistance such that upon applying the feed voltage, the heating current flowing through the heating field has an at least approximately homogeneous current density distribution, and
a length of the at least one supply tract is dimensioned such that the second electrode has a predefinable electric resistance, the electric resistance being equivalent to the sheet resistance of the heatable coating in a surface area that corresponds to the at least one coating-free zone.

2. The transparent pane according to claim 1, wherein the at least one electrode trace is provided with a free end.

3. The transparent pane according to claim 1, wherein the at least one electrode trace comprises linear electrode traces distributed around part of the edge of the at least one coating-free zone.

4. The transparent pane according to claim 1, wherein the at least one supply tract comprises a coating disposed outside the at least one coating-free zone and is partially disposed within the at least one coating-free zone.

5. The transparent pane according to claim 1, wherein the at least one supply tract is disposed completely within the at least one coating-free zone.

6. The transparent pane according to claim 1, wherein the at least one supply tract follows at least the edge of the zone edge, beyond which the at least one connection zone extends.

7. The transparent pane according to claim 1, wherein the at least one supply tract circumferentially follows the zone edge.

8. The transparent pane according to claim 1, wherein the at least one supply tract is disposed over the at least one coating-free zone.

9. The transparent pane according to claim 1, wherein the at least one second electrode has at least two supply tracts, which are connected to the at least one electrode trace.

10. The transparent pane according to claim 1, wherein the at least one supply tract consists of at least two supply parts separated from each other, which have respective coupling sections electrically connected to the electrically heatable coating, the two coupling sections being disposed such that they are galvanically coupled by the electrically heatable coating.

11. The transparent pane according to claim 10, wherein the two coupling sections have an approximately parallel course.

12. The transparent pane according to claim 10, wherein a first coupling section is connected to one of the at least two first electrodes provided for connection to one of the two terminals of the voltage source and a second coupling section is connected to the at least one electrode trace.

13. The transparent pane according to claim 3 wherein two or more electrode traces are implemented like a comb.

14. The transparent pane according to claim 3, wherein the linear electrode traces distributed around part of the edge form a comb structure.

15. A method for manufacturing a transparent pane:
providing an electrically heatable coating,
forming at least two first electrodes provided for electrical connection to two terminals of a voltage source, the at least two first electrodes being electrically connected to the electrically heatable coating such that by applying a feed voltage, a heating current flows over a heating field situated between the at least two first electrodes,
- providing at least one coating-free zone in the heating field, the at least one coating-free zone being bounded by a zone edge formed by the electrically heatable coating, and
- providing at least one second electrode provided for electrical connection to one of the two terminals of the voltage source, the at least one second electrode having at least one supply tract disposed at least partially in the at least one coating-free zone and at least one electrode trace connected to the at least one supply tract, wherein:
the at least one electrode trace extends starting from the at least one coating-free zone, beyond an edge of the zone edge, the edge is formed by a section of the heating field, which is situated between the at least one coating-free zone and one of the at least two first electrodes provided for connection to the other one of the two terminals of the voltage source, the at least one second electrode has a resistance such that upon applying the feed voltage, the heating current flowing through the heating field has an at least approximately homogeneous current density distribution, and a length of the at least one supply tract is dimensioned such that the second electrode has a predefinable electric resistance, the electric resistance being equivalent to the sheet resistance of the heatable coating in a surface area that corresponds to the at least one coating-free zone.

16. The method according to claim 15, wherein the at least one electrode trace comprises linear electrode traces forming a comb structure and further comprising distributing the linear electrode traces around part of the edge of the at least one coating-free zone.

* * * * *